US012760654B2

(12) United States Patent
Martina et al.

(10) Patent No.: US 12,760,654 B2
(45) Date of Patent: Oct. 13, 2026

(54) METHODS AND APPARATUS TO CONTROL A SURFACE OF AN AIRCRAFT ENGINE

(71) Applicants: General Electric Company, Evendale, OH (US); GE Avio S.r.l., Rivalta di Torino (IT)

(72) Inventors: Vincenzo Martina, Alpignano (IT); Jeffrey D. Clements, Mason, OH (US); Kevin Graziano, Liberty Township, OH (US); Arthur W. Sibbach, Boxford, MA (US)

(73) Assignees: General Electric Company, Evendale, OH (US); GE Avio S.r.l, Rivalta di Torino (IT)

( * ) Notice: Subject to any disclaimer, the term of this patent is extended or adjusted under 35 U.S.C. 154(b) by 0 days.

(21) Appl. No.: 19/355,610

(22) Filed: Oct. 10, 2025

(65) Prior Publication Data

US 2026/0132720 A1 May 14, 2026

Related U.S. Application Data

(63) Continuation of application No. 18/945,171, filed on Nov. 12, 2024, now Pat. No. 12,454,894.

(51) Int. Cl.
*F01D 11/24* (2006.01)

(52) U.S. Cl.
CPC ........ *F01D 11/24* (2013.01); *F05D 2220/323* (2013.01)

(58) Field of Classification Search
CPC .......... F01D 11/24; F01D 11/20; F01D 25/24; F01D 11/18; F01D 25/12; F05D 2220/323; F02C 3/06; F02C 7/12
See application file for complete search history.

(56) References Cited

U.S. PATENT DOCUMENTS

| | | | | |
|---|---|---|---|---|
| 10,316,752 | B2 | 6/2019 | Robson et al. | |
| 11,560,239 | B2 | 1/2023 | Rambo et al. | |
| 11,655,725 | B2 | 5/2023 | Poissant et al. | |
| 11,913,341 | B2 | 2/2024 | Fukunaga et al. | |
| 2006/0225430 | A1 * | 10/2006 | Paprotna .................. | F02C 6/08 60/785 |
| 2010/0139288 | A1 | 6/2010 | Rago | |
| 2011/0088405 | A1 | 4/2011 | Turco | |
| 2013/0111919 | A1 | 5/2013 | Chehab et al. | |
| 2014/0182264 | A1 | 7/2014 | Weisgerber et al. | |

(Continued)

FOREIGN PATENT DOCUMENTS

| | | | |
|---|---|---|---|
| CN | 114427482 | A | 5/2022 |

*Primary Examiner* — Chelsea E Stinson
*Assistant Examiner* — Eric A Lange
(74) *Attorney, Agent, or Firm* — Hanley, Flight & Zimmerman, LLC

(57) ABSTRACT

Methods and apparatus to control a surface of an aircraft engine are disclosed. An example system to control a surface in an aircraft engine comprises a first valve to vary a flow of cold fluid from a thermal transfer bus (TTB) to an active surface control (ASC) system based on an operating condition of the aircraft engine, the ASC system positioned adjacent to the surface, the first valve positioned upstream from the surface, and a second valve to vary a flow of hot fluid from the TTB to the ASC system based on the operating condition, the second valve positioned downstream from the surface.

19 Claims, 7 Drawing Sheets

(56) References Cited

U.S. PATENT DOCUMENTS

| | | | | |
|---|---|---|---|---|
| 2014/0314567 | A1 | 10/2014 | Morrison | |
| 2016/0326915 | A1 | 11/2016 | Baladi | |
| 2017/0363094 | A1* | 12/2017 | Kumar | F02C 7/185 |
| 2018/0320541 | A1 | 11/2018 | Zelesky et al. | |
| 2019/0078459 | A1 | 3/2019 | Eastwood et al. | |
| 2019/0128135 | A1* | 5/2019 | Skertic | F01D 11/24 |
| 2019/0153952 | A1 | 5/2019 | Niergarth et al. | |
| 2022/0195927 | A1 | 6/2022 | Rambo | |
| 2022/0275757 | A1 | 9/2022 | Rambo et al. | |

* cited by examiner

METHODS AND APPARATUS TO CONTROL A SURFACE OF AN AIRCRAFT ENGINE

RELATED APPLICATION

This patent arises from a continuation of U.S. patent application Ser. No. 18/945,171, which was filed on Nov. 12, 2024. U.S. patent application Ser. No. 18/945,171 is hereby incorporated herein by reference in its entirety. Priority to U.S. patent application Ser. No. 18/945,171 is hereby claimed.

FIELD OF THE DISCLOSURE

This disclosure relates generally to aircraft systems and, more particularly, to methods and apparatus to control a surface of an aircraft engine.

BACKGROUND

Aircraft typically include various accessory systems supporting the operation of the aircraft and/or engine(s) of the aircraft. For example, such accessory systems may include a lubrication system that lubricates components of the engine(s), an engine cooling system that provides cooling air to engine components, an environmental control system that provides cooled air to the cabin of the aircraft, etc. As such, heat is added or removed from a fluid (e.g., oil, air, etc.) during operation of these accessory systems.

Figure 1A:
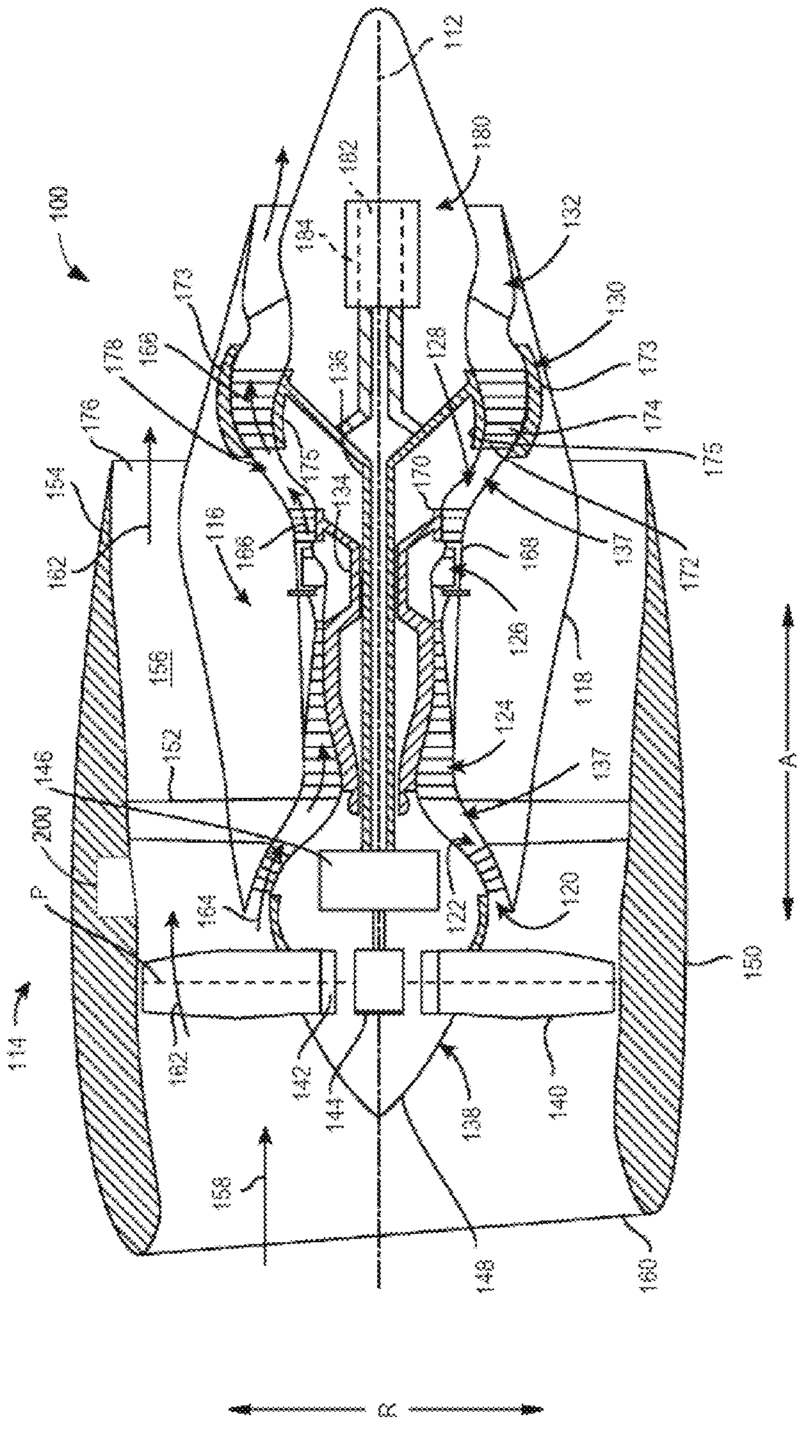
FIG. 1A is a schematic cross-sectional view of a gas turbine engine that can incorporate various examples disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

Temperatures in an engine vary significantly during operation. The variance in temperature causes components in the engine to change size during engine operations. Specifically, the components expand when temperatures increase and contract when temperatures decrease. The size change can cause damage and/or reduced efficiency in the engine if no response is taken. For example, an increase in the size of rotor blades in the engine can cause tips of the rotor blades to rub against a casing positioned around the rotor blades. The rubbing can damage the rotor blades and/or the casing and/or reduce a speed at which the rotor blades rotate. Further, a reduced size of the rotor blades that results from a temperature reduction can cause an undesired increase in separation between the tips of the rotor blades and the casing. In turn, the increased separation allows more fluid to flow past the rotor blades between the tips and the casing, which reduces an efficiency (e.g., a fuel efficiency) of the engine.

In some instances, to provide active clearance control (ACC), air from a compressor section and/or a fan bypass section is redirected to a turbine casing to cause the turbine casing to expand and maintain a clearance with adjacent rotor blade tips. In such instances, sensors in the engine monitor the clearance between the rotor blade tips and the casing. Based on the detected clearance, air from the compressor section and/or the fan bypass section is redirected to the casing. However, causing the air compressor section and/or the fan bypass section to be redirected to the casing after the clearance changes still results in some damage and/or loss in efficiency. Specifically, the clearance has already changed such that tip rubbing and/or an undesired increase in tip clearance may occur for a period of time before the responsive control enables the casing to expand or contract.

Examples disclosed herein provide autonomous and dynamic expansion and contraction of control surfaces based on operating conditions of an engine, as opposed to merely reacting to a monitored clearance between the blade tips and the casing. Clearance control operations disclosed herein are linked to engine operating conditions. As such, a control surface, such as a turbine casing or any other surface in the engine, can expand or contract with (e.g., at a same time as) rotor blades positioned in the casing to maintain the desired blade tip clearance throughout the engine operations. For example, examples disclosed herein proactively provide fluid flow to the control surface based on a speed of the engine, which advantageously maintains a desired blade tip clearance during transient operations. For example, as a speed of the engine increases, hot fluid is directed to the control surface to proactively cause the control surface to expand. Further, as the speed of the engine decreases, cold fluid is directed to the control surface to proactively cause the control surface to contract.

Referring now to the drawings, FIG. 1A is a schematic cross-sectional view of a gas turbine engine 100 that can incorporate various examples disclosed herein. More particularly, for the example of FIG. 1A, the gas turbine engine 100 is a high-bypass turbofan jet engine, referred to herein as "turbofan engine 100." As shown in FIG. 1A, the turbofan engine 100 defines an axial direction A (extending parallel to a longitudinal axis 112 provided for reference), a radial direction R, and a circumferential direction (i.e., a direction extending about the axial direction A; not depicted). In general, the turbofan engine 100 includes a fan section 114 and a core turbine engine 116 disposed downstream from the fan section 114.

The example core turbine engine 116 depicted generally includes a substantially tubular outer casing 118 that defines an annular inlet 120. The outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. The compressor section, combustion section 126, and turbine section together define a core air flow path 137 extending from the annular inlet 120 through the LP compressor 122, HP compressor 124, combustion section 126, HP turbine section 128, LP turbine section 130 and jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122.

For the example depicted in FIG. 1A, the fan section 114 includes a variable pitch fan 138 having a plurality of fan blades 140 coupled to a disk 142 in a spaced apart manner. As depicted, the fan blades 140 extend outwardly from disk 142 generally along the radial direction R. Each fan blade 140 is rotatable relative to the disk 142 about a pitch axis P by virtue of the fan blades 140 being operatively coupled to a suitable actuation member 144 configured to collectively vary the pitch of the fan blades 140 in unison. The fan blades 140, disk 142, and actuation member 144 are together rotatable about the longitudinal axis 112 by LP shaft 136 across a power gearbox 146. The power gearbox 146 includes a plurality of gears for stepping down the rotational speed of the LP shaft 136 to a more efficient rotational fan speed.

Referring still to the example of FIG. 1A, the disk 142 is covered by rotatable front nacelle 148 aerodynamically contoured to promote an airflow through the plurality of fan blades 140. Additionally, the example fan section 114 includes an annular fan casing or outer nacelle 150 that circumferentially surrounds the fan 138 and/or at least a portion of the core turbine engine 116. It should be appreciated that for the example depicted, the nacelle 150 is supported relative to the core turbine engine 116 by a plurality of circumferentially-spaced outlet guide vanes 152. Moreover, a downstream section 154 of the nacelle 150 extends over an outer portion of the core turbine engine 116 so as to define a bypass airflow passage 156 therebetween.

During operation of the turbofan engine 100, a volume of air 158 enters the turbofan engine 100 through an associated inlet 160 of the nacelle 150 and/or fan section 114. As the volume of air 158 passes across the fan blades 140, a first portion of the air 158 as indicated by arrows 162 is directed or routed into the bypass airflow passage 156 and a second portion of the air 158 as indicated by arrow 164 is directed or routed into the LP compressor 122. The ratio between the first portion of air 158 at arrows 162 and the second portion of air 158 at arrows 164 is commonly known as a bypass ratio. The temperature and pressure of the second portion of air 158 at the arrows 164 are then increased as it is routed through the high pressure (HP) compressor 124 and into the combustion section 126, where it is mixed with fuel and burned to provide combustion gases 166.

The combustion gases 166 are routed through the HP turbine 128 where a portion of thermal and/or kinetic energy from the combustion gases 166 is extracted via sequential stages of HP turbine stator vanes 168 that are coupled to a HP turbine case and HP turbine rotor blades 170 that are coupled to the HP shaft or spool 134, thus causing the HP shaft or spool 134 to rotate, which supports operation of the HP compressor 124. The combustion gases 166 are then routed through the LP turbine 130 where a second portion of thermal and kinetic energy is extracted from the combustion gases 166 via sequential stages of a plurality of LP turbine stator vanes 172 that are coupled to an outer drum or casing 173, and a plurality of LP turbine rotor blades 174 that are coupled to an inner drum or shaft 175. The plurality of LP turbine rotor blades 174 are rotatable with one another to together drive the LP shaft or spool 136, thus causing the LP shaft or spool 136 to rotate. Such rotation of the LP shaft or spool 136 supports operation of the LP compressor 122 and/or rotation of the fan 138 through a gearbox 146.

The combustion gases 166 are subsequently routed through the jet exhaust nozzle section 132 of the core turbine engine 116 to provide propulsive thrust. Simultaneously, the pressure of the first portion of air 162 is substantially increased as the first portion of air 162 is routed through the bypass airflow passage 156 before it is exhausted from a fan nozzle exhaust section 176 of the turbofan engine 100, also providing propulsive thrust. The HP turbine 128, the LP turbine 130, and the jet exhaust nozzle section 132 at least partially define a hot gas path 178 for routing the combustion gases 166 through the core turbine engine 116.

Additionally, the example turbofan engine 100 depicted in the example of FIG. 1A includes an electric machine 180 rotatable with the fan 138. Specifically, for the example depicted, the electric machine 180 is co-axially mounted to and rotatable with the LP shaft 136 (the LP shaft 136 also rotating the fan 138 through, for the example depicted, the power gearbox 146). As used herein, "co-axially" refers to the axes of the electric machine 180 and the LP shaft 136 being aligned. It should be appreciated, however, that in other examples, an axis of the electric machine 180 may be offset radially from the axis of the LP shaft 136 and further may be oblique to the axis of the LP shaft 136, such that the electric machine 180 may be positioned at any suitable location at least partially inward of the core air flow path 137.

The electric machine 180 includes a rotor 182 (or rather, multiple rotors, as will be explained in more detail, below) and a stator 184. It will be appreciated that, in certain examples, the turbofan engine 100 may be integrated into a propulsion system. With such an example, the electric machine 180 may be electrically connected, or connectable, to one or more electric propulsion devices of the propulsion system (such as one or more electric fans), one or more power storage devices, etc.

The turbine engine 100 includes a heat exchange system 200, which can also be referred to as a thermal transport bus, for transferring heat between fluids supporting the operation of the aircraft. In this respect, the heat exchange system 200 may be positioned within the engine 100. For example, as shown in FIG. 1A, the heat exchange system 200 is positioned within the nacelle 150 of the engine 100. However, in alternative examples, the heat exchange system 200 may be positioned at any other suitable location within the engine 100, such as in the outer casing 118.

It should be appreciated, however, that the example turbofan engine 100 depicted in FIG. 1A is by way of example only, and that in other examples, the turbofan engine 100 may have any other suitable configuration. For example, in other examples, the turbofan engine 100 may instead be configured as any other suitable turbomachine including, e.g., any other suitable number of shafts or spools, and excluding, e.g., the power gearbox 146 and/or fan 138, etc. Accordingly, it will be appreciated that in other examples, the turbofan engine 100 may instead be configured as, e.g., a ducted turbofan engine, an unducted turbofan engine, a turbojet engine, a turboshaft engine, a turboprop engine, a water-enhanced turbofan (WET), a combined steam cycle (CSC) engine, a hybrid-electric propulsor including one or more electric motors, etc.

Figure 1B:
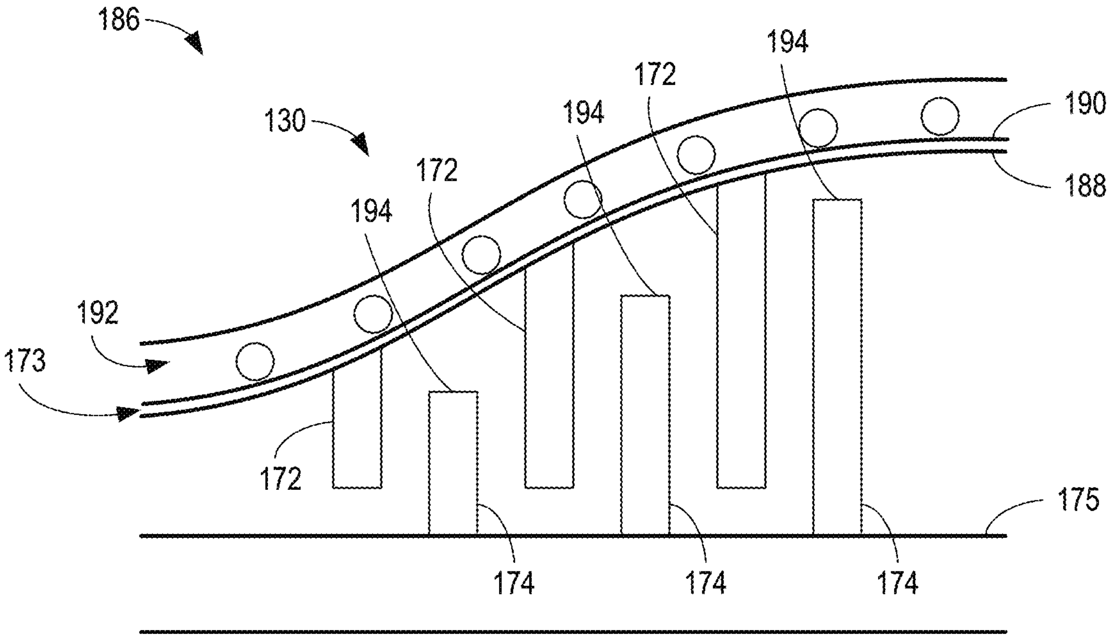
FIG. 1B is a schematic cross-sectional view of an active clearance control (ACC) system.

FIG. 1B is a schematic cross-sectional view of an active surface control (ASC) system. In FIG. 1B, the ASC system is an active clearance control (ACC) system 186 associated with a section of the LP turbine 130 (or the HP turbine 128) of the turbofan engine 100 of FIG. 1A. However, the description of the FIG. 1B can apply to the control of any surface via an ASC system. In FIG. 1B, cooling fluid is directed the LP turbine 130 to control a clearance between the LP turbine rotor blades 174 and the outer casing 173. The outer casing 173 includes an inner surface 188 facing the LP turbine rotor blades 174 and an outer surface 190 facing away from the inner surface 188. Piping structure(s) 192 at least partially cover or surround the outer surface 190. The piping structures 192 carry the fluid (e.g., cooling fluid).

Controlling the distance (e.g., clearance) between tips 194 of the LP turbine rotor blades 174 and corresponding portions of the outer casing 173 contributes to the efficiency of the LP turbine 130. During operation, the LP turbine rotor blades 174 are exposed to thermal conditions (e.g., hot air or cold air) and mechanical loads (e.g., centrifugal forces), which can expand and contract the outer casing 173 or the LP turbine rotor blades 174 (e.g., in a radial direction towards the outer casing 173). The expansion and contraction of the outer casing 173 or the LP turbine rotor blades 174 affects the distance between the tips 194 and the outer casing 173. Typically, minimization and/or other reduction of this distance improves the efficiency of the LP turbine 130 because less air passes between the tips 194 and the outer casing 173 (i.e., less air bypasses the LP turbine rotor blades 174).

The ACC system 186 optimizes, improves, or otherwise maintains tip clearance by pushing air through the piping structures 192 to control a thermal expansion of the outer casing 173. For example, when the heat in the LP turbine 130 causes the outer casing 173 to expand, the ACC system 186 can provide cooling air to the piping structures 192 to reduce the thermal expansion of the outer casing 173 and maintain a desired clearance (e.g., reducing the distance) between the LP turbine rotor blades 174 and the outer casing 173. However, the smaller the distance between the tips 194 and the outer casing 173, the higher the possibility that the tips 194 contact, rub, or otherwise interfere with the outer casing 173 which can degrade the performance of the LP turbine rotor blades 174 or the outer casing 173. Although uncontrolled expansion of the outer casing 173 can negatively impact the efficiency of the LP turbine 130 by increasing the clearances, if the outer casing 173 is never allowed to expand, then the potential for damaging rub events between the tips 194 and the outer casing 173 increases.

Examples disclosed herein enable the expansion or contraction of a control surface (e.g., the outer casing 173) based on an operating condition of an aircraft engine. For example, disclosed examples enable the expansion or contraction of the outer casing 173 of the LP turbine 130 based on an operating condition (e.g., speed) of the turbofan engine 100. In some examples, disclosed examples provide hot fluid to the ACC system 186 to cause expansion (e.g., rapid expansion, responsive expansion, etc.) of the outer casing 173 in response to an operating condition of the turbofan engine 100. As such, disclosed examples enable expansion of the LP turbine rotor blades 174 while mitigating the possibility of the tips 194 rubbing against the inner surface of the outer casing 173. Alternatively, disclosed examples enable contraction of the outer casing 173 based on an operating condition of the turbofan engine 100. For example, when the aircraft decelerates, disclosed examples direct cold fluid through the ACC system 186 to cool the outer casing 173 (e.g., as quickly as possible) to ensure the outer casing 173 maintains alignment with the shrinking LP turbine rotor blades 174. In some examples, at least two valves control the flow of hot fluid and cold fluid with respect to the control surface. Examples disclosed herein provide autonomous and dynamic expansion and contraction of control surfaces based on operating conditions of the turbofan engine 100, as opposed to merely reacting to a monitored clearance between the LP turbine rotor blades 174 and the outer casing 173.

Figure 2:
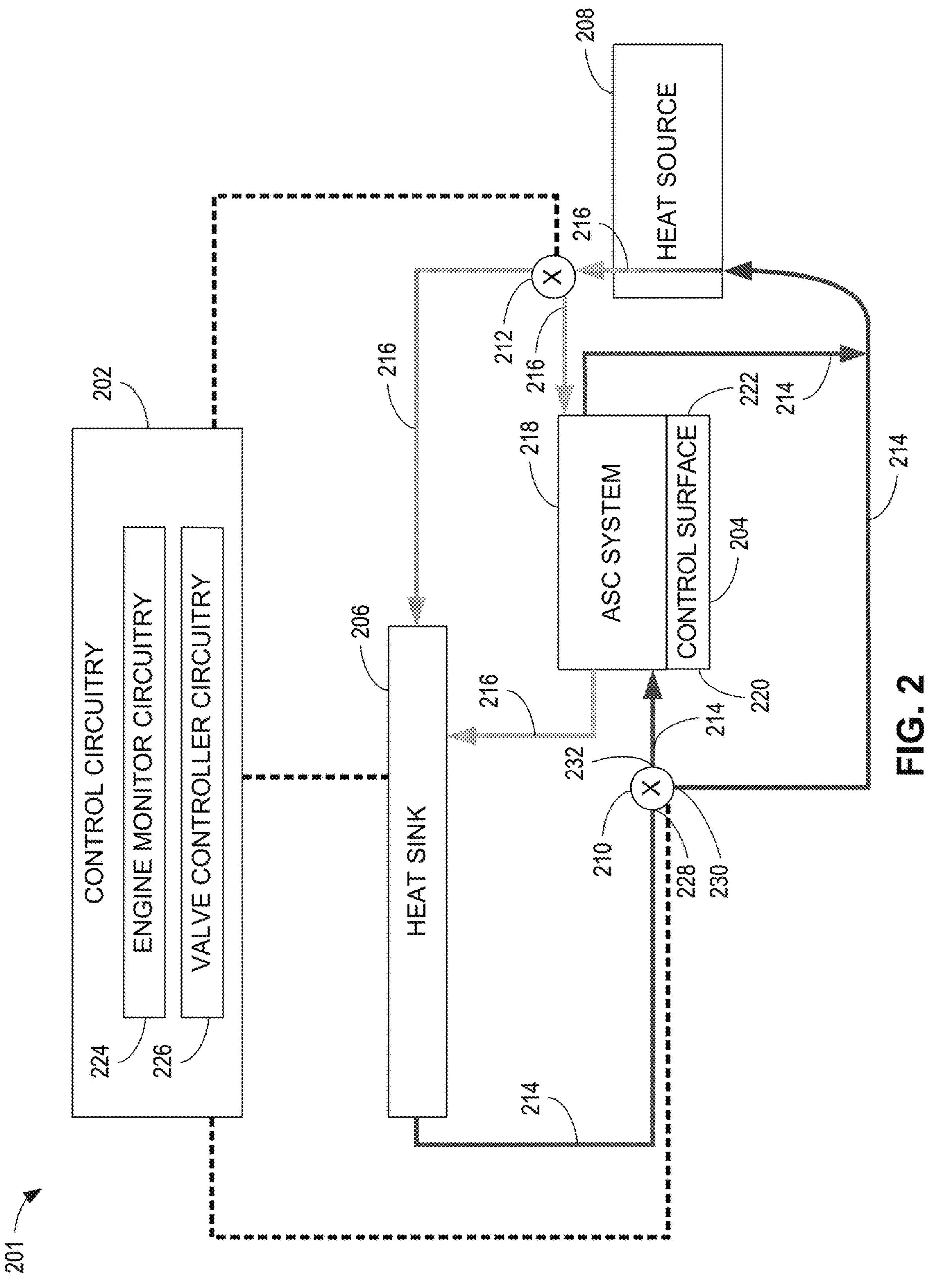
FIG. 2 is a schematic diagram of an example valve control system in which example control circuitry controls a control surface.

FIG. 2 is a schematic diagram of an example valve control system 201 in which example control circuitry 202 controls an example control surface 204. Although introduced above in the context of the LP turbine 130 (e.g., the outer casing 173 of the LP turbine 130), the control surface 204 can be another surface in the turbofan engine 100 where expansion/contraction control is advantageous. The valve control system 201 includes an example heat sink 206, an example heat source 208, an example first valve 210, and an example second valve 212. The control circuitry 202 is coupled to the first valve 210 and the second valve 212. As such, the control circuitry 202 controls operations (e.g., opening, closing, partial opening/closing, etc.) of the first and second valves 210, 212. Example arrows 214 illustrate the flow of cold fluid in the valve control system 201. As such, the arrows 214 represent piping structures that guide the flow of the cold fluid. Example arrows 216 illustrate the flow of hot fluid in the valve control system 201. As such, the arrows 216 represent piping structures that guide the flow of the hot fluid.

In FIG. 2, an example active surface control (ASC) system 218 is positioned adjacent to the control surface 204. Similar to the ACC system 186 described in connection with FIG. 1B, the ASC system 218 includes piping structures extending along or at least partially covering the control surface 204 to facilitate the flow of fluid to, across, adjacent, etc., the control surface 204 (e.g., akin the ACC system 186 facilitating the flow of cold fluid to the outer casing 173). However, the ASC system 218 can facilitate the flow of fluid of any temperature across the control surface 204 to regulate the expansion/contraction of the control surface 204. For example, the first valve 210 varies (e.g., controls) a flow of cold fluid from the heat sink 206 to the ASC system 218. In some examples, the heat sink 206 is a thermal transfer bus (TTB). Further, the second valve 212 varies a flow of hot fluid from the heat sink 206 to the ASC system 218, wherein the hot fluid was heated by the heat source 208 prior to reaching or entering the second valve 212. The heat source 208 can include or otherwise be coupled to a lubrication system such as a Fuel Cooled Oil Cooler (FCOC) or an Air Cooled Oil Cooler (ACOC), a compressor intercooler heat exchanger, a combustor section coolant and dilution pre-cooled modulated turbine cooling heat exchanger, sump air, a waste heat recovery (WHR) heat exchanger, or other air heat exchanger. In some examples, the cold fluid and the hot fluid are thermal bus fluids such as molecular nitrogen ($N_2$), molecular hydrogen ($H_2$), or molecular carbon dioxide ($CO_2$) (e.g., $CO_2$ in a gaseous state, $CO_2$ in a supercritical state). In some examples, the cold fluid and the hot fluid are thermal bus fluids in a liquid state, a gaseous state, or a supercritical state. In some examples, the control surface 204 includes metal (e.g., stainless steel, aluminum alloys, nickel alloys, super alloys, etc.). In some examples, the control surface 204 includes a ceramic thermal barrier coating or any other surface treatment (e.g., silver plating, chromium plating, etc.).

In some examples, the first valve 210 is positioned on an example first side 220 of the control surface 204 and the second valve 212 is positioned on an example second side 222 of the control surface 204 opposite the first side 220. In some examples, the second valve 212 is spaced apart from the first valve 210 in an axial direction of the turbofan engine 100. In some examples, the control surface 204 is spaced apart from the first valve 210 and the second valve 212 in the axial direction. Further, the control surface 204 is positioned between the first valve 210 and the second valve 212 in the axial direction.

The control circuitry 202 includes example engine monitor circuitry 224 and example valve controller circuitry 226. The control circuitry 202 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the control circuitry 202 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The engine monitor circuitry 224 monitors an operating condition of an example aircraft engine (e.g., the turbofan engine 100). In some examples, the engine monitor circuitry 224 monitors a rate of rotation of the rotor, the turbine blades, the compressor blades, etc., to determine the operating condition of the aircraft engine. In some examples, the operating condition is an acceleration or a deceleration of the aircraft engine. The engine monitor circuitry 224 determines changes in the operating condition (e.g., before, during, or after flight). For example, the engine monitor circuitry 224 determines a change in the operating condition when a speed and/or acceleration of the aircraft changes (e.g., when the aircraft accelerates or decelerates). In some examples, the engine monitor circuitry 224 determines a change in the operating condition when a rate of the rotation of the turbine blades increases or decreases, when a rate of rotation of the rotor and the rotor blades increases or decreases, etc. In some examples, the engine monitor circuitry 224 is instantiated by programmable circuitry executing engine monitoring instructions and/or configured to perform operations such as those represented by the flowchart of FIG. 5.

In some examples, the control circuitry 202 includes means for monitoring an aircraft engine. For example, the means for monitoring may be implemented by the engine monitor circuitry 224. In some examples, the engine monitor circuitry 224 may be instantiated by programmable circuitry such as the example programmable circuitry 612 of FIG. 6. For instance, the engine monitor circuitry 224 may be instantiated by machine executable instructions such as those implemented by at least blocks 502, 504, 508, 512 of FIG. 5. In some examples, the engine monitor circuitry 224 may be instantiated by hardware logic circuitry, which may be implemented by an ASIC, XPU, or the FPGA circuitry configured and/or structured to perform operations corresponding to the machine readable instructions. Additionally or alternatively, the engine monitor circuitry 224 may be instantiated by any other combination of hardware, software, and/or firmware. For example, the engine monitor circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

As shown in FIG. 2, the first valve 210 includes an example inlet 228 that is fluidly coupled to the heat sink 206, an example first outlet 230 fluidly coupled to the second valve 212, and an example second outlet 232 fluidly coupled to the ASC system 218. As such, the first valve 210 is positioned or configured to direct a flow of cold fluid from the heat sink 206 to the ASC system 218 through the second outlet 232. Further, the first valve 210 is positioned or configured to direct a flow of cold fluid from the heat sink 206 to the second valve 212 via the first outlet 230. In other words, the second valve 212 is to receive fluid from the heat sink 206 via the first valve 210. As such, the second valve 212 is fluidly coupled to the first valve 210. Further, the first valve 210 directs the flow of cold fluid through the first outlet 230 towards the heat source 208 (e.g., on the way to the second valve 212).

In some examples, the valve controller circuitry 226 causes at least one of the first valve 210 or the second valve 212 to redirect the flow of fluid based on the operating condition or the changed operating condition. In some examples, the valve controller circuitry 226 causes the first valve 210 to direct a flow of cold fluid from the heat sink 206 to the ASC system 218 (e.g., via the second outlet 232) based on the operating condition of the aircraft. In some examples, the valve controller circuitry 226 causes the first valve 210 to direct a flow of the cold fluid from the heat sink 206 to the second valve 212 (e.g., via the first outlet 230) based on the operating condition of the aircraft. In such examples, the flow of cold fluid from the first outlet 230 of the first valve 210 traverses the heat source 208, which heats up the fluid prior to entering the second valve 212. For example, the valve controller circuitry 226 causes the first valve 210 to decrease the flow of fluid from the heat sink 206 to the ASC system 218 based on the operating condition (e.g., when the rate of rotation of the turbine blades exceeds a threshold). Further, the valve controller circuitry 226 causes the second valve 212 to increase the flow of fluid from the heat sink 206 (e.g., fluid routed through the first outlet 230 of the first valve 210 and traverses the heat source 208) based on the operating condition (e.g., when the rate of rotation of the turbine blades exceeds a threshold). In such examples, the valve controller circuitry 226 selectively directs fluid (e.g., hot fluid and cold fluid) to the ASC system 218 to control an expansion or contraction of the control surface 204. In some examples, the control surface 204 contracts or shrinks when the valve controller circuitry 226 directs cold fluid through the ASC system 218. In some examples, the control surface 204 expands when the valve controller circuitry 226 directs hot fluid through the ASC system 218. In some examples, the valve controller circuitry 226 is instantiated by programmable circuitry executing valve controller instructions and/or configured to perform operations such as those represented by the flowchart of FIG. 5.

In some examples, the control circuitry 202 includes means for controlling a valve. For example, the means for controlling may be implemented by the valve controller circuitry 226. In some examples, the valve controller circuitry 226 may be instantiated by programmable circuitry such as the example programmable circuitry 612 of FIG. 6. For instance, the valve controller circuitry 226 may be instantiated by machine executable instructions such as those implemented by at least blocks 506, 510, 514 of FIG. 5. In some examples, the valve controller circuitry 226 may be instantiated by hardware logic circuitry, which may be implemented by an ASIC, XPU, or the FPGA circuitry configured and/or structured to perform operations corresponding to the machine readable instructions. Additionally or alternatively, the valve controller circuitry 226 may be instantiated by any other combination of hardware, software, and/or firmware. For example, the valve controller circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 3:
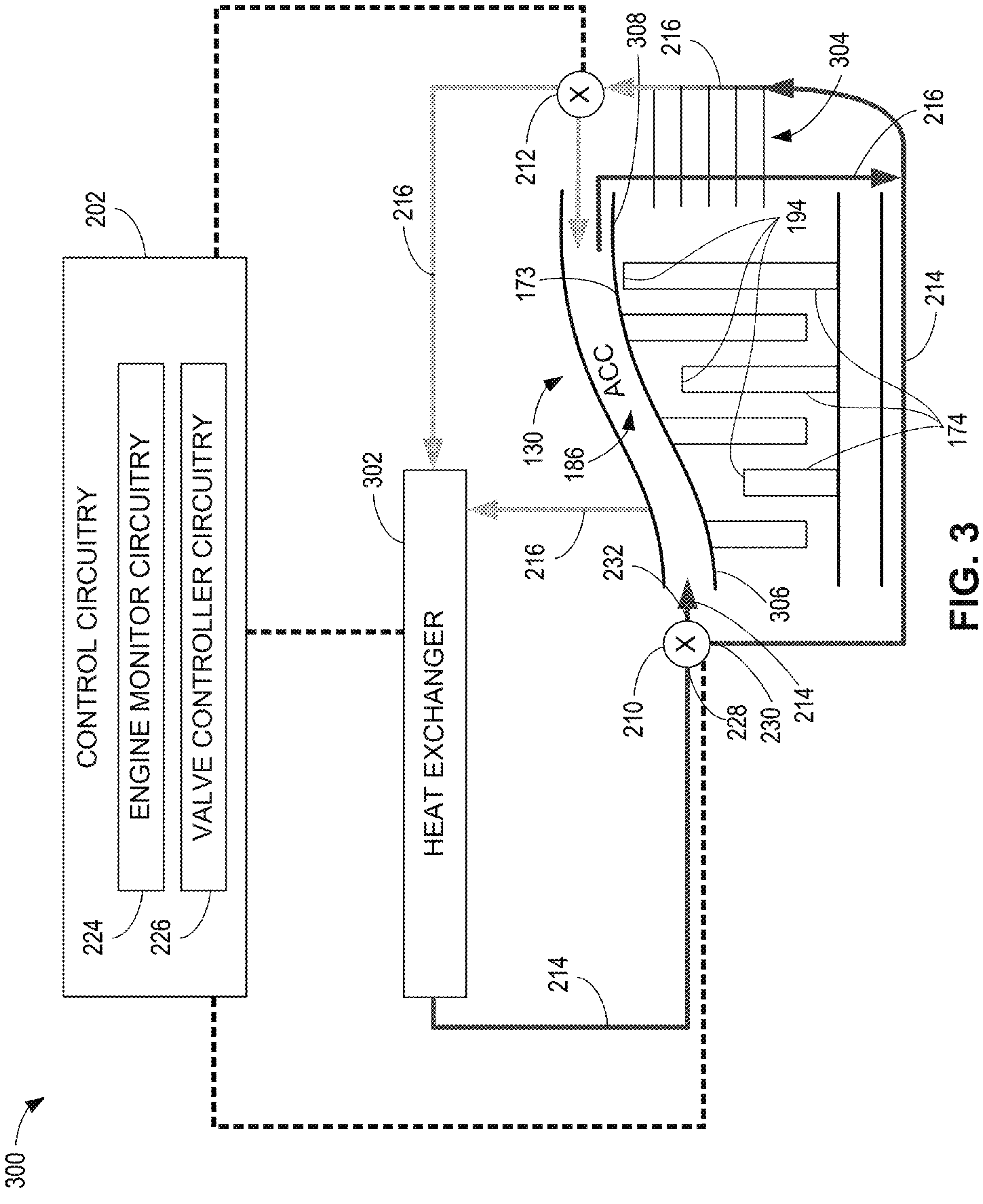
FIG. 3 is a schematic diagram of another example valve control system implementing the control circuitry of FIG. 2.

FIG. 3 is a schematic diagram of another example valve control system 300 (e.g., a thermal transport bus) implementing the control circuitry 202 of FIG. 2. The valve control system 300 of FIG. 3 is similar to the valve control system 201 of FIG. 2. Thus, the same reference numbers used in FIG. 2 will be used for the same or similar features shown in FIG. 3 and the description of such features provided in connection with FIG. 2 applies similarly to the same features shown in FIG. 3. The valve control system 300 includes the LP turbine 130 of FIG. 1B. Thus, the same reference numbers used in FIG. 1B will be used for the same or similar features shown in FIG. 3 and the description of such features provided in connection with FIG. 1B applies similarly to the same features shown in FIG. 3. Although discussed in the context of controlling an expansion/contraction of the LP turbine 130, it should be understood that features shown in and/or discussed in connection with FIG. 3 can be applicable to another surface in the turbofan engine 100 where expansion/contraction control is advantageous.

The valve control system 300 includes the LP turbine 130, the ACC system 186, the first valve 210, the second valve 212, the control circuitry 202, an example heat exchanger 302, and an example exhaust section 304 of the LP turbine 130. The example of FIG. 3, the ASC system is the ACC system 186 associated with the LP turbine 130. In the valve control system 300, the heat exchanger 302 is the heat sink and the exhaust section 304 is the heat source. In some examples, the heat exchanger 302 is a thermal transfer bus (TTB).

In some examples, the heat source is positioned upstream from the LP turbine 130. However, in FIG. 3, the heat source (e.g., the exhaust section 304) is downstream from the LP turbine 130. In some examples, the exhaust section 304 is coupled to or otherwise includes a WHR heat exchanger. In such examples, the WHR heat exchanger (or other heat source) is adjacent to the exhaust section 304. In some examples, the valve control system 300 utilizes another heat source in addition to or instead of the WHR heat exchanger in the exhaust section 304. Further, the first valve 210 is positioned upstream from the outer casing 173 of the LP turbine 130 and the second valve 212 is positioned downstream from the outer casing 173. As such, the first valve 210 is positioned adjacent an example first side 306 of the outer casing 173 and the second valve 212 is positioned adjacent an example second side 308 of the outer casing 173 opposing the first side 306. The second valve 212 is spaced apart from the first valve 210 in an axial direction of the turbofan engine 100. The outer casing 173 is spaced apart from the first valve 210 and the second valve 212 in the axial direction. Further, the outer casing 173 is positioned between the first valve 210 and the second valve 212 in the axial direction.

In the example of FIG. 3, the first valve 210 varies a flow of fluid from the heat exchanger 302 to the ACC system 186 based on an operating condition of the turbofan engine 100. Further, the second valve 212 varies a flow of fluid from the heat exchanger 302 to the ACC system 186 based on the operating condition. The fluid controlled by the first valve 210 has a first temperature and the fluid controlled by the second valve 212 has a second temperature greater than the first temperature (e.g., due to the fluid traversing the exhaust section 304). The first temperature and the second temperature can be in a range of 150 degrees Fahrenheit (° F.) to 1000° F. In some examples, the valve control system 201 includes mass flow sensors, temperature sensors (e.g., to monitor the temperature of the fluid control by the first valve 210 and the second valve 212), strain gauges (e.g., associated with the control surface 204 to measure/monitor expansion/contraction), etc.

The valve controller circuitry 226 controls operations of the first valve 210 and the second valve 212 based on operating conditions of the turbofan engine 100 (e.g., monitored by the engine monitor circuitry 224). In a first example operating condition of the turbofan engine 100, the aircraft is cruising. For example, during cruise, the LP turbine rotor blades 174 are rotating at a relatively low rate (e.g., in a range of about 75% to 85% of rated speed of the engine rotor). Further, the outer casing 173 is relatively cool (e.g., compared to takeoff or other acceleration of the turbofan engine 100). Although cruise is provided as one example of the first operating condition, it should be understood that the first operating condition can correspond to operations other than cruise.

When the engine monitor circuitry 224 determines that the turbofan engine 100 transitions into a second operating condition, such as, for example, burst or acceleration, the rate of rotation of the LP turbine rotor blades 174 increases. This generates heat within the LP turbine 130, which in turn causes the LP turbine rotor blades 174 and the outer casing 173 to expand as the heat rises/increases. Although burst and acceleration are provided as examples of the second operating condition, it should be understood that the second operating condition can correspond to operations other than cruise. If, in the second operating condition, the outer casing 173 expands too quickly as a result of the heat (e.g., the outer casing 173 expands quicker than the LP turbine rotor blades 174), a clearance between the LP turbine rotor blades 174 and the outer casing 173 increases, which reduces an efficiency with which the turbofan engine 100 operates. To maintain the clearance in a desired range, the valve controller circuitry 226 controls operations of the first and second valves 210, 212 to increase a flow of hot fluid to the ACC system 186 such that the outer casing 173 expands as the LP turbine rotor blades 174 expand. For example, the valve controller circuitry 226 causes the first valve 210 to decrease (e.g., gradually decrease, incrementally decrease, etc.) or limit the flow of cold fluid from the heat exchanger 302 to the ACC system 186. Further, the valve controller circuitry 226 causes the second valve 212 to increase (e.g., gradually increase, incrementally increase, etc.) the flow of hot fluid from the heat exchanger 302 (traversing the exhaust section 304) to the ACC system 186. Therefore, when the rate of rotation of the LP turbine rotor blades 174 increases beyond a threshold (e.g., when the turbofan engine 100 transitions from cruise to acceleration), the valve controller circuitry 226 can selectively direct fluid flow via the first and second valves 210, 212 to control the expansion of the outer casing 173.

Likewise, the valve controller circuitry 226 can selectively direct fluid flow via the first and second valves 210, 212 to control the contraction (e.g., shrinking) of the outer casing 173. In the second operating condition (e.g., acceleration), the outer casing 173 is in an expanded position to enable the LP turbine rotor blades 174 to rotate with little to no rubbing on the outer casing 173. When the engine monitor circuitry 224 determines that the turbofan engine 100 is transitioning from the second operating condition (e.g., acceleration) to the first operating condition (e.g., cruise), the rotor decreases the rate of rotation of the LP turbine rotor blades 174. This reduces the heat in the LP turbine 130 such that the LP turbine rotor blades 174 and the outer casing 173 begin to contract. If the outer casing 173 does not contract quickly enough, the gap between the tips 194 and the outer casing 173 can be too large and can result in decreased efficiency of the LP turbine 130. To lessen the gap as the LP turbine rotor blades 174 contract, the valve controller circuitry 226 controls operations of the first and second valves 210, 212 to increase a flow of cold fluid to the ACC system 186 such that the outer casing 173 contracts as the LP turbine rotor blades 174 contract. For example, the valve controller circuitry 226 causes the first valve 210 to increase (e.g., gradually increase, incrementally increase, etc.) the flow of cold fluid from the heat exchanger 302 to the ACC system 186. Further, the valve controller circuitry 226 causes the second valve 212 to decrease (e.g., gradually decrease, incrementally decrease, etc.) or limit the flow of hot fluid from the heat exchanger 302 (traversing/bypassing the exhaust section 304) to the ACC system 186. Therefore, when the rate of rotation of the LP turbine rotor blades 174 is less than a threshold (e.g., when the turbofan engine 100 transitions from acceleration to cruise), the valve controller circuitry 226 can selectively direct fluid flow via the first and second valves 210, 212 to control the contraction of the outer casing 173.

In some examples, by controlling the hot and cold fluid flow, the valve controller circuitry 226 enables a dimension of a control surface, such as, for example, a diameter of the outer casing 173, to be adjusted based on the engine operations. This adjustment will allow the clearance between the outer casing and the rotor tip to be minimized or otherwise reduced. For example, the clearance can be reduced to 5 mils, to 3 mils, or to 1 mil. In some examples, due to out-of-roundness in the outer casing 173, the granularity with which the valve controller circuitry 226 can implement adjustments will reduce and result in clearances larger than those quoted without considering the out-of-roundness. A ratio of the largest to smallest diameter between which the valve controller circuitry 226 can cause the outer casing 173 to vary can be in the vicinity of 1.01 or 1.02. Although these adjustments are of relatively small dimensions, the desired clearance between the LP turbine rotor blades 174 and the outer casing 173 can be less than 1 mil in a desired operating situation, and variance from the desired clearance can reduce an efficiency of the turbofan engine 100.

Figure 4:
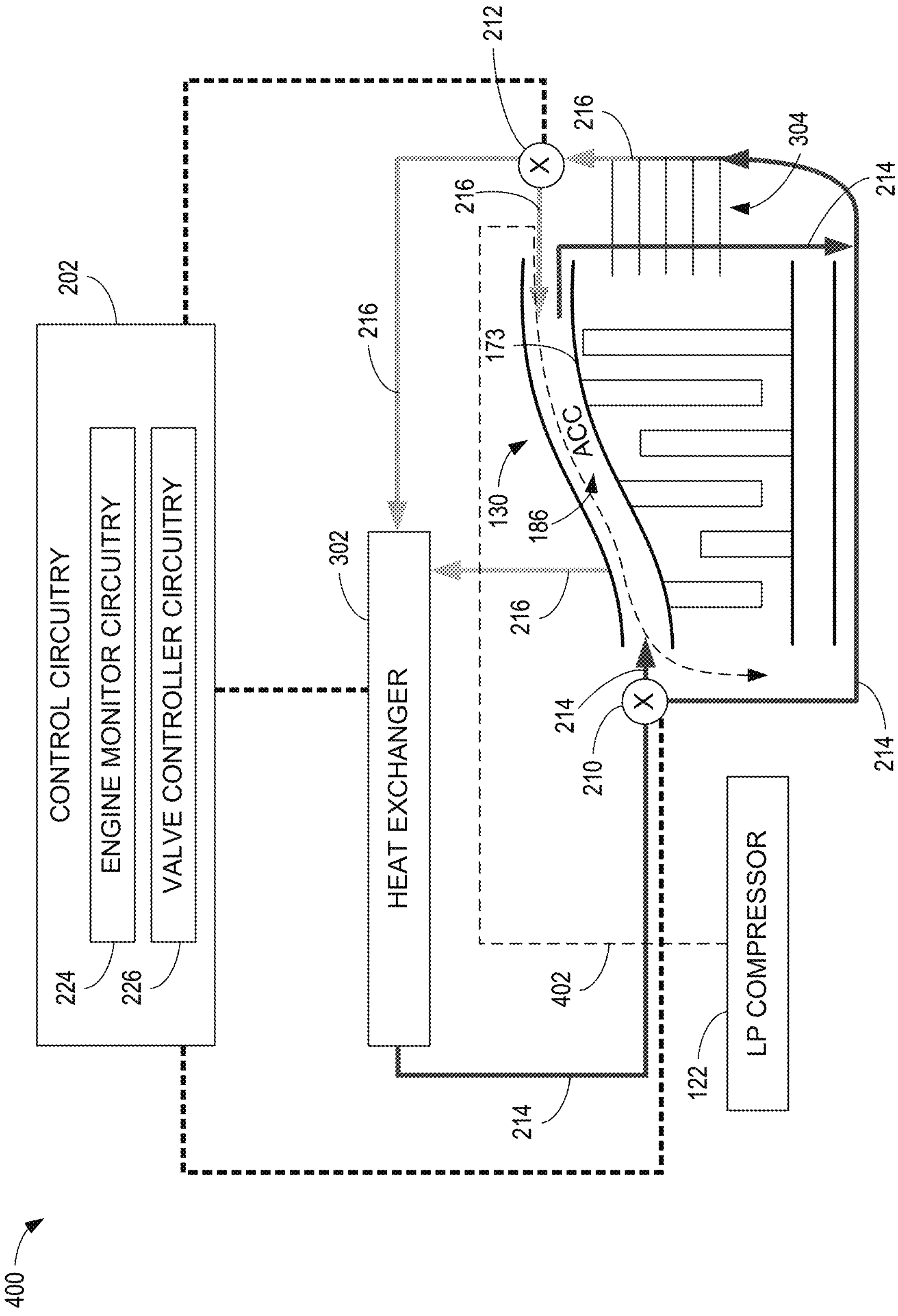
FIG. 4 is a schematic diagram of another example valve control system implementing the control circuitry of FIG. 2.

FIG. 4 is a schematic diagram of another example valve control system 400 (e.g., a thermal transport bus) implementing the control circuitry 202 of FIG. 2. The valve control system 400 of FIG. 4 is similar to the valve control system 300 of FIG. 3. Thus, the same reference numbers used in FIG. 3 will be used for the same or similar features shown in FIG. 4 and the description of such features provided in connection with FIG. 3 applies similarly to the same features shown in FIG. 4. Although discussed in the context of controlling an expansion/contraction of the LP turbine 130, it should be understood that features shown in and/or discussed in connection with FIG. 4 can be applicable to another surface in the turbofan engine 100 where expansion/contraction control is advantageous.

The valve control system 400 of FIG. 4 directs or controls compressor bleed air from the LP compressor 122 (or the HP compressor 124). For example, the valve control system 400 directs the compressor bleed air along a direction indicated by example arrow 402 through the ACC system 186. The compressor bleed air provides cool/cold air to the ACC system 186. As such, the valve control system 400 provides the cool compressor bleed air from the LP compressor 122 to contract the outer casing 173 (e.g., to align with the contracting/shrinking LP turbine rotor blades 174). In some examples, the ACC system 186 includes or is otherwise coupled to a heat exchanger to facilitate the guidance of the cool compressor bleed air.

While an example manner of implementing the control circuitry 202 of FIG. 1 is illustrated in FIG. 2, one or more of the elements, processes, and/or devices illustrated in FIG. 2 may be combined, divided, re-arranged, omitted, eliminated, and/or implemented in any other way. Further, the engine monitor circuitry 224, the valve controller circuitry 226, and/or, more generally, the example control circuitry 202 of FIG. 2, may be implemented by hardware alone or by hardware in combination with software and/or firmware. Thus, for example, any of the engine monitor circuitry 224, the valve controller circuitry 226, and/or, more generally, the example control circuitry 202, could be implemented by programmable circuitry in combination with machine readable instructions (e.g., firmware or software), processor circuitry, analog circuit(s), digital circuit(s), logic circuit(s), programmable processor(s), programmable microcontroller (s), graphics processing unit(s) (GPU(s)), digital signal processor(s) (DSP(s)), ASIC(s), programmable logic device (s) (PLD(s)), and/or field programmable logic device(s) (FPLD(s)) such as FPGAs. Further still, the example control circuitry 202 of FIG. 2 may include one or more elements, processes, and/or devices in addition to, or instead of, those illustrated in FIG. 2, and/or may include more than one of any or all of the illustrated elements, processes and devices.

Figure 5:
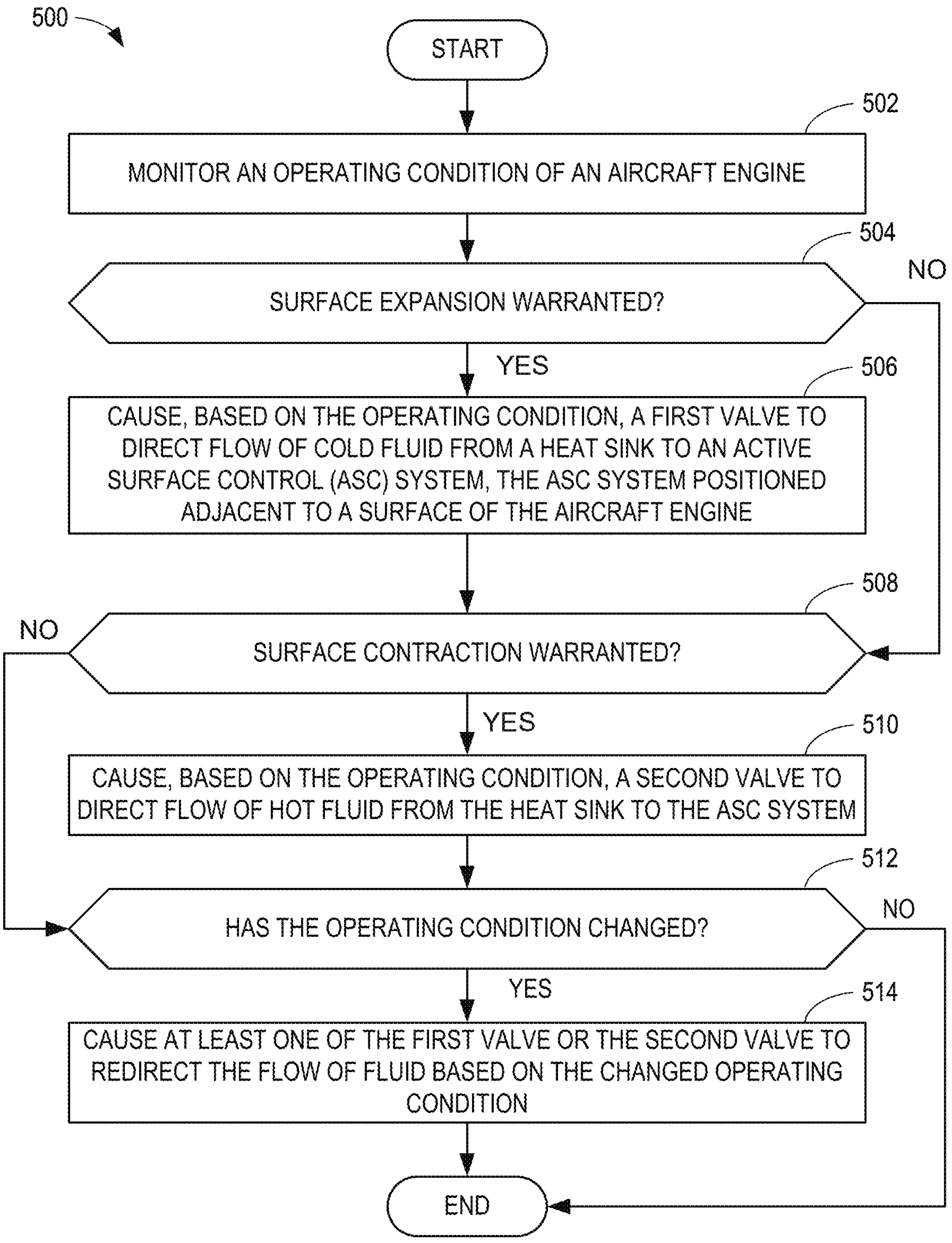
FIG. 5 is a flowchart representative of example machine readable instructions and/or example operations that may be executed, instantiated, and/or performed by example programmable circuitry to implement the control circuitry of FIG. 2.

A flowchart representative of example machine readable instructions, which may be executed by programmable circuitry to implement and/or instantiate the control circuitry 202 of FIG. 2 and/or representative of example operations which may be performed by programmable circuitry to implement and/or instantiate the control circuitry 202 of FIG. 2, are shown in FIG. 5. The machine readable instructions may be one or more executable programs or portion(s) of one or more executable programs for execution by programmable circuitry such as the programmable circuitry 612 shown in the example programmable circuitry platform 600 discussed below in connection with FIG. 6. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 5, many other methods of implementing the example control circuitry 202 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As previously mentioned, the example operations of FIG. 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to control the control surface 204. The example machine-readable instructions and/or the example operations 500 of FIG. 5 begin at block 502, at which the engine monitor circuitry 224 monitors an operating condition of an aircraft engine (e.g., the turbofan engine 100). In some examples, the operating condition is an acceleration or a deceleration of the aircraft engine. In some examples, the operating condition corresponds to a speed of the aircraft engine.

At block 504, the engine monitor circuitry 224 determines whether surface contraction is warranted. For example, the engine monitor circuitry 224 can determine whether surface contraction is warranted based on the operating condition. In some examples, the engine monitor circuitry 224 determines that surface contraction is warranted when the operating condition is associated with or includes a deceleration and/or reduced speed of the aircraft engine. When the engine monitor circuitry 224 determines that surface contraction is warranted, the operations 500 proceed to block 506. Otherwise, the operations 500 skip to block 508.

At block 506, the valve controller circuitry 226 causes, based on the operating condition, the first valve 210 to direct flow of cold fluid from the heat sink 206 to the ASC system 218, the ASC system 218 positioned adjacent to the control surface 204 of the aircraft engine. For example, when the turbofan engine 100 is accelerating, the valve controller circuitry 226 causes, controls, adjusts, moves, manipulates, etc., the first valve 210 to decrease (e.g., gradually decrease, incrementally decrease, etc.) or limit the flow of cold fluid from the heat exchanger 302 to the ACC system 186.

At block 508, the engine monitor circuitry 224 determines whether surface expansion is warranted. For example, the engine monitor circuitry 224 can determine whether surface expansion is warranted based on the operating condition. In some examples, the engine monitor circuitry 224 determines that surface expansion is warranted when the operating condition is associated with or includes an increased acceleration and/or speed of the aircraft engine. When the engine monitor circuitry 224 determines that surface expansion is warranted, the operations 500 proceed to block 510. Otherwise, the operations 500 skip to block 512.

At block 510, the valve controller circuitry 226 causes, based on the operating condition, the second valve 212 to direct flow of hot fluid from the heat sink 206 to the ASC system 218. For example, when the turbofan engine 100 is accelerating, the valve controller circuitry 226 causes, controls, adjusts, moves, manipulates, etc., the second valve 212 to increase (e.g., gradually increase, incrementally increase, etc.) the flow of hot fluid from the heat exchanger 302 (traversing the exhaust section 304) to the ACC system 186.

At block 512, the engine monitor circuitry 224 determines whether the operating condition has changed. For example, the engine monitor circuitry 224 determines that the operating condition has changed when the turbofan engine 100 decelerates. In such examples, control of the process proceeds to block 510. Alternatively, the engine monitor circuitry 224 determines that the operating condition has not changed when the speed or acceleration of the turbofan engine 100 is relatively constant (e.g., within +/−0.1% speed). In such examples, the process ends.

At block 514, the valve controller circuitry 226 causes at least one of the first valve 210 or the second valve 212 to redirect the flow of fluid based on the changed operating condition. For example, when the turbofan engine 100 decelerates (e.g., transitions from the second operating condition (e.g., acceleration) back to the first operating condition (e.g., cruise)), the valve controller circuitry 226 causes at least one of the first valve 210 or the second valve 212 to redirect the flow of fluid. For example, the valve controller circuitry 226 causes the first valve 210 to increase (e.g., gradually increase, incrementally increase, etc.) the flow of cold fluid from the heat exchanger 302 to the ACC system 186. Further, the valve controller circuitry 226 causes the second valve 212 to decrease (e.g., gradually decrease, incrementally increase, etc.) or limit the flow of hot fluid from the heat exchanger 302 (traversing the exhaust section 304) to the ACC system 186. As such, the valve controller circuitry 226 controls operations of the first and second valves 210, 212 to increase a flow of cold fluid to the ACC system 186 such that the outer casing 173 contracts as the LP turbine rotor blades 174 contract. Then, the process ends.

Figure 6:
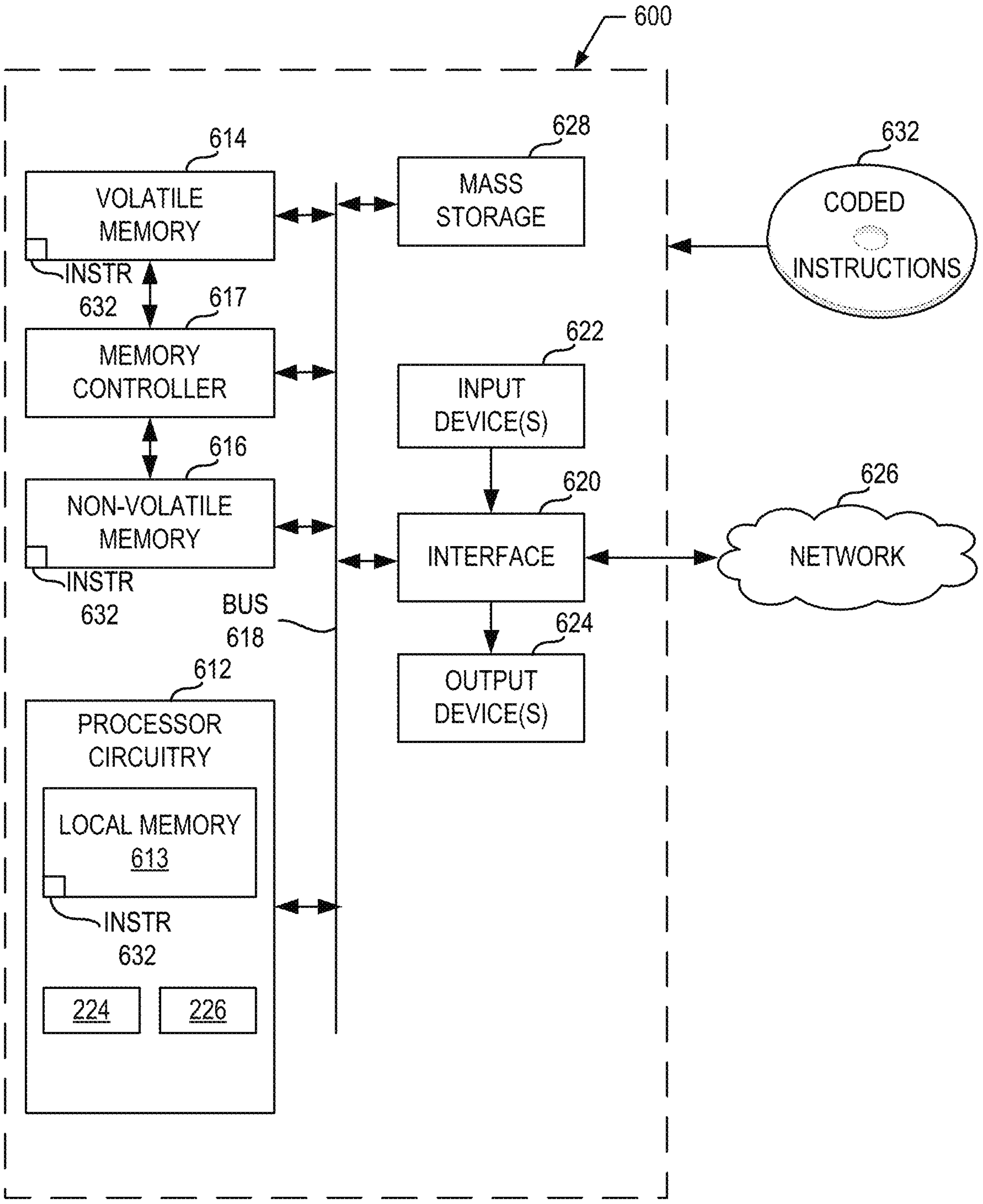
FIG. 6 is a block diagram of an example processing platform including programmable circuitry structured to execute, instantiate, and/or perform the example machine readable instructions and/or perform the example operations of FIG. 5 to implement the control circuitry of FIG. 2.

FIG. 6 is a block diagram of an example programmable circuitry platform 600 structured to execute and/or instantiate the example machine-readable instructions and/or the example operations of FIG. 5 to implement the control circuitry 202 of FIG. 2. The programmable circuitry platform 600 can be, for example, a Digital Engine Control (DEC), Full Authority Digital Engine Control (FADEC), or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the engine monitor circuitry 224 and the valve controller circuitry 226.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, ARINC 429, ARINC 653, or ARINC 664 avionics communication standards.

In the illustrated example, one or more input devices 622 are connected to the interface circuitry 620. The input device(s) 622 can be engine sensors that identify engine operating conditions, such as speeds, temperatures or pressures.

One or more output devices 624 are also connected to the interface circuitry 620 of the illustrated example. The output device(s) 624 can be implemented, for example, by actuator, valves or other devices that cause a change in engine operation.

The interface circuitry 620 of the illustrated example also includes a communication device such as a transmitter, a receiver, a transceiver, a modem, a residential gateway, a wireless access point, and/or a network interface to facilitate exchange of data with external machines (e.g., aircraft control systems) by a network 626. The communication can be by, for example, an Ethernet connection, ARINC 429, 653 or 664 communication bus or other secure aircraft data network.

The programmable circuitry platform 600 of the illustrated example also includes one or more mass storage discs or devices 628 to store firmware, software, and/or data. Examples of such mass storage discs or devices 628 include solid-state storage discs or devices such as flash memory devices and/or SSDs.

The machine readable instructions 632, which may be implemented by the machine readable instructions of FIG. 5, may be stored in the mass storage device 628, in the volatile memory 614, in the non-volatile memory 616.

From the foregoing, it will be appreciated that example systems, apparatus, articles of manufacture, and methods have been disclosed that enable the expansion or contraction of a control surface (e.g., the outer casing 173) based on an operating condition of an aircraft engine. For example, disclosed examples enable the expansion or contraction of the outer casing 173 of the LP turbine 130 based on an operating condition (e.g., speed) of the turbofan engine 100. In some examples, hot fluid is provided to the ACC system 186 to cause expansion (e.g., rapid expansion, responsive expansion, etc.) of the outer casing 173 in response to an operating condition of the turbofan engine 100. As such, disclosed examples enable expansion of the LP turbine rotor blades 174 while mitigating the possibility of the tips 194 rubbing against the inner surface of the outer casing 173. Alternatively, disclosed examples enable contraction of the outer casing 173 based on an operating condition of the turbofan engine 100. For example, when the aircraft decelerates, disclosed examples direct cold fluid through the ACC system 186 to cool the outer casing 173 (e.g., as quickly as possible) to ensure the outer casing 173 maintains alignment with the shrinking LP turbine rotor blades 174. In some examples, at least two valves control the flow of hot fluid and cold fluid with respect to the control surface. Examples disclosed herein provide autonomous and dynamic expansion and contraction of control surfaces based on operating conditions of the turbofan engine 100, as opposed to merely reacting to a monitored clearance between the LP turbine rotor blades 174 and the outer casing 173.

Further aspects of the present disclosure are provided by the subject matter of the following clauses:

An example system to control a surface in an aircraft engine comprises a first valve to vary a flow of cold fluid from a thermal transfer bus (TTB) to an active surface control (ASC) system based on an operating condition of the aircraft engine, the ASC system positioned adjacent to the surface, the first valve positioned upstream from the surface, and a second valve to vary a flow of hot fluid from the TTB to the ASC system based on the operating condition, the second valve positioned downstream from the surface.

The system of any preceding clause, wherein the cold fluid and the hot fluid are molecular nitrogen $$(N_2),$$

molecular hydrogen $$(H_2),$$

molecular carbon dioxide $$(CO_2),$$

helium (He), or molecular $$CO_2.$$

The system of any preceding clause, wherein the cold fluid and the hot fluid are thermal bus fluids in a liquid state, a gaseous state, or a supercritical state.

The system of any preceding clause, wherein the second valve is fluidly coupled to the first valve, the second valve to receive the fluid from the TTB via the first valve.

The system of any preceding clause, further including machine-readable instructions, and at least one processor circuit to cause the machine-readable instructions to cause, based on the operating condition, the first valve to direct the flow of cold fluid from the TTB to the ASC system, and cause, based on the operating condition, the second valve to direct the flow of hot fluid from the TTB to the ASC system.

The system of any preceding clause, wherein the at least one processor circuit is to cause the machine-readable instructions to determine a change in the operating condition, and cause at least one of the first valve or the second valve to redirect the flow of fluid based on the changed operating condition.

The system of any preceding clause, wherein the change in the operating condition is an increase or a decrease in a rate of rotation of turbine blades in a turbine of the aircraft engine.

The system of any preceding clause, wherein the change in the operating condition is an increase or a decrease in a rate of rotation of rotor blades in a compressor of the aircraft engine.

The system of any preceding clause, wherein the first valve is to direct the flow of cold fluid to a heat source, the heat source to heat the cold fluid.

The system of any preceding clause, wherein the heat source is a waste heat recovery (WHR) heat exchanger.

The system of any preceding clause, wherein the surface is a turbine casing of a turbine, wherein the heat source is positioned upstream or downstream from the turbine.

The system of any preceding clause, wherein the heat source is positioned downstream from the turbine, the heat source adjacent to an exhaust section of the turbine.

The system of any preceding clause, wherein the ASC is an active clearance control (ACC) system associated with the turbine.

An example apparatus to control a surface in an aircraft engine comprises a first valve to control a flow of fluid from a thermal transfer bus (TTB) to an active surface control (ASC) system based on an operating condition of the aircraft engine, the ASC system extending along the surface, the first valve positioned adjacent a first side of the surface, the fluid controlled by the first valve having a first temperature, and a second valve fluidly coupled to the first valve, the second valve to control a flow of the fluid from the TTB to the ASC system based on the operating condition, the second valve positioned adjacent a second side of the surface, the second side opposing the first side, the fluid controlled by the second valve having a second temperature greater than the first temperature.

The apparatus of any preceding clause, wherein the fluid from the first valve traverses a heat source prior to entering the second valve.

The apparatus of any preceding clause, wherein the operating condition is a rate of rotation of turbine blades in a turbine of the aircraft engine or a rate of rotation of rotor blades in a compressor of the aircraft engine.

The apparatus of any preceding clause, wherein the surface is a turbine casing of the turbine, further including machine-readable instructions, and at least one processor circuit to cause the machine-readable instructions to cause the first valve to decrease the flow of fluid from the TTB to the ASC system when the rate of rotation of the turbine blades exceeds a threshold, and cause, based on the operating condition, the second valve to increase the flow of fluid from the TTB to the ASC system when the rate of rotation of the turbine blades exceeds the threshold.

An example valve control system to vary a flow of fluid across a surface of an aircraft engine comprising a first valve to vary a flow of hot fluid from a thermal transfer bus (TTB) to an active surface control (ASC) system based on an operating condition of the aircraft engine, the ASC system to at least partially cover the surface, and a second valve spaced apart from the first valve in an axial direction of the aircraft engine, the second valve having an inlet fluidly coupled to the TTB, a first outlet fluidly coupled to the first valve, and a second outlet fluidly coupled to the ASC, the second valve to direct a flow of cold fluid, based on the operating condition, from the TTB to the ASC through the second outlet.

The valve control system of any preceding clause, wherein the second valve is to direct a flow of the cold fluid, based on the operating condition, from the TTB to the first valve via the first outlet.

The valve control system of any preceding clause, wherein the surface is spaced apart from the first valve and the second valve in the axial direction, the surface positioned between the first valve and the second valve in the axial direction.

The system of any preceding clause, wherein the fluid from the first valve traverses the exhaust section prior to entering the second valve.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to control a surface in an aircraft engine, the apparatus comprising:

interface circuitry;

machine readable instructions; and programmable circuitry to at least one of instantiate or execute the machine readable instructions to:

identify an operating condition of the aircraft engine;

in response to the operating condition corresponding to a first operating condition, configure a first valve to direct a flow of cold fluid from a thermal transfer bus (TTB) to an active surface control (ASC) system to cause the surface to contract; and in response to the operating condition corresponding to a second operating condition different than the first operating condition, configure a second valve to direct a flow of hot fluid from the TTB to the ASC system to cause the surface to expand.

2. The apparatus of claim 1, wherein the first operating condition includes a deceleration of the aircraft engine.

3. The apparatus of claim 1, wherein the first operating condition includes an acceleration of the aircraft engine.

4. The apparatus of claim 1, wherein, in response to the operating condition corresponding to a third operating condition different than the first operating condition and the second operating condition, the programmable circuitry is to at least one of instantiate or execute the machine readable instructions to:

configure the first valve to block the flow of the cold fluid from the TTB to the ASC system; and configure the second valve to block the flow of the hot fluid from the TTB to the ASC system.

5. The apparatus of claim 4, wherein the third operating condition corresponds to a requested speed of the aircraft engine being within +/−0.1% of an instantaneous speed of the aircraft engine.

6. The apparatus of claim 4, wherein the cold fluid encounters a waste heat recovery heat between the first valve and the second valve in response to the operating condition being the first operating condition, the second operating condition, and the third operating condition.

7. The apparatus of claim 1, wherein the programmable circuitry is to at least one of instantiate or execute the machine readable instructions to determine the operating condition is the first operating condition in response to identifying a cruise condition associated with the aircraft engine.

8. The apparatus of claim 1, wherein the programmable circuitry is to at least one of instantiate or execute the machine readable instructions to determine the operating condition is the second operating condition in response to identifying a takeoff condition associated with the aircraft engine.

9. A non-transitory machine readable storage medium comprising instructions to cause programmable circuitry to at least:

in response to an operating condition of an aircraft engine corresponding to a first operating condition, configure a first valve to direct a flow of cold fluid from a thermal transfer bus (TTB) to an active surface control (ASC) system to cause a surface of the aircraft engine to contract; and in response to the operating condition corresponding to a second operating condition different than the first operating condition, configure a second valve to direct a flow of hot fluid from the TTB to the ASC system to cause the surface to expand.

10. The non-transitory machine readable storage medium of claim 9, wherein the instructions cause the programmable circuitry to:

identify the first operating condition in response to a rate of rotation of low-pressure turbine blades being less than a threshold; and identify the second operating condition in response to the rate of rotation of the low-pressure turbine blades exceeding the threshold.

11. The non-transitory machine readable storage medium of claim 9, wherein, in response to the operating condition corresponding to a third operating condition different than the first operating condition and the second operating condition, the instructions cause the programmable circuitry to:

configure the first valve to block the flow of the cold fluid from the TTB to the ASC system on a first side of the surface; and configure the second valve to block the flow of the hot fluid from the TTB to the ASC system on a second side of the surface opposite the first side.

12. The non-transitory machine readable storage medium of claim 9, wherein the instructions cause the programmable circuitry to cause the surface to expand as blades of a turbine section of the aircraft engine expand.

13. The non-transitory machine readable storage medium of claim 9, cause the surface to contract as blades of a turbine section of the aircraft engine contract.

14. A method to control a surface in an aircraft engine, the method comprising:

identifying an operating condition of the aircraft engine; and in response to the operating condition corresponding to a first operating condition, configuring a first valve to direct a flow of hot fluid from a thermal transfer bus (TTB) to an active surface control (ASC) system to cause the surface to expand, wherein the hot fluid is hotter than the surface to enable the hot fluid to cause the surface to expand; and in response to the operating condition corresponding to a second operating condition different than the first operating condition, configuring a second valve to direct a flow of cold fluid from the TTB to the ASC system to cause the surface to contract.

15. The method of claim 14, further including, heating the cold fluid downstream of the second valve and upstream of the first valve in the first operating condition and the second operating condition.

16. The method of claim 15, wherein, in response to the operating condition corresponding to the second operating condition, causing the cold fluid to receive first heat in the ASC system and second heat in a waste heat recovery heat exchanger downstream of the second valve and upstream of the first valve.

17. The method of claim 16, further including causing the cold fluid to receive the second heat in the waste heat recovery heat exchanger in response to the operating condition corresponding to the first operating condition.

18. The method of claim 17, wherein configuring the first valve to direct the flow of the hot fluid from the TTB to the ASC causes the hot fluid to enter the ASC downstream of the surface.

19. The method of claim 18, wherein configuring the second valve to direct the flow of the cold fluid from the TTB to the ASC causes the cold fluid to enter the ASC upstream of the surface.

* * * * *